United States Patent [19]
Grunow et al.

[11] Patent Number: 6,062,331
[45] Date of Patent: May 16, 2000

[54] AUXILIARY HYDRAULIC CONTROL SYSTEM FOR A WORK MACHINE

[75] Inventors: Timothy W. Grunow, Lowpoint, Ill.; Raymond T. Schenck, Sanford, N.C.; Steven T. Ufheil, East Peoria, Ill.

[73] Assignee: S.A.R.L., Peoria, Ill.

[21] Appl. No.: 09/169,499

[22] Filed: Oct. 9, 1998

[51] Int. Cl.$^7$ .................................................. B60R 21/00
[52] U.S. Cl. ........................ 180/268; 180/273; 180/324
[58] Field of Search .................................. 180/268, 272, 180/273, 324

[56] References Cited

U.S. PATENT DOCUMENTS

| | | | |
|---|---|---|---|
| 3,269,482 | 8/1966 | McCarthy, Jr. .......................... | 180/268 |
| 4,385,612 | 5/1983 | Masaki et al. ........................... | 123/489 |
| 4,385,863 | 5/1983 | Minor ....................................... | 414/699 |
| 4,579,191 | 4/1986 | Klee et al. ................................ | 180/268 |
| 4,782,938 | 11/1988 | Cooper et al. ........................... | 180/273 |
| 4,843,817 | 7/1989 | Shivvers et al. ......................... | 60/487 |
| 4,844,196 | 7/1989 | Clevenger et al. ...................... | 180/273 |
| 4,871,044 | 10/1989 | Strosser et al. .......................... | 180/273 |
| 4,881,371 | 11/1989 | Haeder et al. ............................ | 60/431 |
| 4,949,805 | 8/1990 | Mather et al. ........................... | 180/333 |
| 5,046,311 | 9/1991 | Cartner ..................................... | 60/468 |
| 5,174,115 | 12/1992 | Jacobson et al. ......................... | 60/484 |
| 5,203,440 | 4/1993 | Peterson et al. ......................... | 192/0.094 |
| 5,577,876 | 11/1996 | Haeder et al. ............................ | 414/699 |
| 5,590,731 | 1/1997 | Jacobson .................................. | 180/53.4 |
| 5,616,964 | 4/1997 | Peterson, Jr. ............................. | 180/273 |
| 5,711,391 | 1/1998 | Brandt et al. ............................. | 180/273 |

*Primary Examiner*—Kenneth R. Rice
*Attorney, Agent, or Firm*—Haverstock, Garrett & Roberts

[57] ABSTRACT

An auxiliary hydraulic control system for controlling the flow of hydraulic fluid within an auxiliary hydraulic circuit associated with a particular work machine wherein such system includes a first bi-directional proportional switch actuatable to control the direction of flow within the auxiliary hydraulic circuit in either a first or a second direction and at a flow rate which is proportional to the amount of pressure being exerted on the switch in the selected direction, a second switch actuatable to provide continuous flow in the selected direction and at the selected flow rate, and an electronic controller coupled to the first and second switches for receiving signals therefrom, the controller outputting a signal to initiate continuous flow in the selected direction and at the selected flow rate when the controller receives signals indicative of the first switch being actuated, the second switch being actuated, and the first switch being released within a predetermined period of time after the second switch has been actuated. An interlock override feature is also provided whereby, under certain operating conditions, the continuous flow function will be allowed to remain active while an operator exits the machine seat.

21 Claims, 4 Drawing Sheets

AUXILIARY HYDRAULIC CONTROL SYSTEM FOR A WORK MACHINE

TECHNICAL FIELD

This invention relates generally to auxiliary hydraulic control systems used on certain types of work machines for controlling the operation of various attachments or tools which mount to such machines and, more particularly, to an electronically controlled auxiliary hydraulic control system which will allow an operator to select continuous flow to the attachment or tool in either a forward or a reverse direction and which, in a preferred embodiment, will allow continuous flow to be selected at a flow rate less than the maximum flow rate available for the auxiliary hydraulic circuit.

BACKGROUND ART

In the case of certain types of work machines such as skid steer loaders, wheel loaders, backhoe loaders and track loaders, attachments or tools such as an auger, sweeper, grapple, backhoe and the like are often times pivotally mounted to the implement lift arm assembly by cooperatively engageable mounting means associated with both the lift arm assembly and the particular attachment or tool. These attachments or tools typically include their own hydraulic motor or actuator to drive and operate the various functions associated with that particular tool or attachment. One hydraulic system, which typically includes an implement hydraulic pump as well as lift and/or tilt cylinders, is used to actuate and control the implement lift and/or tilt mechanisms, which lift and/or tilt mechanisms are commonly referred to as the implement control system. A second and separate hydraulic system, typically referred to as the auxiliary hydraulic system, is used to control the flow of hydraulic fluid between the implement hydraulic pump and the hydraulic motor or actuator associated with the attachment or tool to actuate and control the operation thereof. The flow of hydraulic fluid to the hydraulic motor or actuator associated with the particular attachment or tool is typically controlled through actuation of some type of an auxiliary valve.

Many different types of auxiliary hydraulic control systems are known and utilized including auxiliary hydraulic systems which are electrically controlled through the use of a plurality of switches located in the operator compartment. Often times, the known auxiliary hydraulic control systems include a mode select switch to prevent inadvertent actuation of the continuous flow function as well as different types of pressure relief means and diverter valves which are included within the auxiliary hydraulic circuit to further control the operation thereof. Such known systems typically provide continuous flow in the auxiliary hydraulic circuit in one direction only when a latching switch is activated. See, for example, the electrically controlled auxiliary hydraulic system for a skid steer loader disclosed in U.S. Pat. No. 4,949,805. Still other known auxiliary hydraulic systems are mechanically actuated through a system of control levers, one or more hydraulic control valves, and mechanical linkage.

Often times, depending upon the particular attachment or tool and the particular application or task being performed by such attachment or tool, full hydraulic flow to the particular attachment or tool is not always necessary. In fact, under certain operating conditions, less than full or maximum flow provided by the auxiliary circuit is desirable. This is not always possible with the known systems and, as a result, auxiliary hydraulic system flow rates often times exceed the task requirements. Still further, there are likewise situations where continuous flow to a particular attachment or tool in an opposite or reverse direction is also desirable. Here again, this is not possible with the known systems.

It is therefore desirable to provide an auxiliary hydraulic control system which reduces system components and which eliminates the need for a mode select switch and/or an on-off switch for operation of the auxiliary system. It is also desirable to provide an auxiliary hydraulic control system which will allow for continuous flow in both the forward and reverse directions and which will provide for latching or otherwise allowing the continuous flow command to be set at a flow rate which can be any percentage or scaling of the maximum flow rate available in the selected direction.

Accordingly, the present invention is directed to overcoming one or more of the problems as set forth above.

DISCLOSURE OF THE INVENTION

In accordance with the teachings of the present invention, an auxiliary hydraulic control system is disclosed wherein a plurality of switches located in the operator compartment are used to select the direction of fluid flow to the attachment or tool, to select the fluid flow rate to the attachment or tool, and to thereafter engage continuous flow to the attachment or tool in the selected direction and at the selected flow rate. More particularly, the present system includes a proportional switch which is used to control bi-directional flow in the auxiliary hydraulic circuit, namely, flow in either the forward or reverse direction within the auxiliary circuit, and a momentary switch which is used to latch and provide continuous flow in the selected direction.

The proportional switch is preferably located on the implement control joystick, or other implement control lever, and is a force sensing resistor which normally rests in a relaxed neutral position. Applying force to one side of this switch will generate an output and subsequent hydraulic flow in one direction to the attachment or tool proportional to the force exerted on the switch. Applying a force to the opposite side of this switch will generate an output and subsequent flow in the opposite direction, again proportional to the force exerted on the switch. The extent to which this proportional switch is pushed in a certain direction controls the amount of hydraulic fluid supplied to the attachment's hydraulic motor, and therefore the speed and movement of the attachment. When the proportional switch is released, flow to the attachment's hydraulic motor will stop.

Under certain operating conditions, it is desirable to have continuous flow to the attachment or tool without having to continuously hold the proportional switch in one direction or the other. A momentary switch is therefore used to enable the continuous flow function in either direction. This continuous flow switch is likewise located in the operator compartment and can likewise be positioned on the implement control joystick or other implement control lever, or such switch can be conveniently located elsewhere in the operator compartment. In order to enable the continuous flow function, the operator must first select the desired flow direction by pressing the proportional switch in the proper direction and thereafter, with the proportional switch still actuated or engaged, the operator must actuate the momentary continuous flow switch. Once the continuous flow switch is actuated, the operator must still further release the proportional switch within a predetermined time period in order to latch the continuous flow command in the selected direction. The continuous flow command will not begin until the proportional switch is released within the prescribed time period. If the prescribed time period expires, the continuous flow command will be ignored and fluid flow to the attachment or tool will be continued in accordance with the activation of the proportional switch. If the momentary continuous flow switch is released within the prescribed time period, the continuous flow command will be latched and outputted to the appropriate solenoids to control the flow to the attachment motor. Once the continuous flow function has been activated, disengagement of the continuous flow function can be accomplished by again pressing the proportional switch in either direction, or by again pressing the momentary continuous flow switch. In addition, the present auxiliary hydraulic control system can likewise be configured such that the continuous flow function will likewise be disengaged whenever any other switch associated with the auxiliary hydraulic circuit, such as one or more high flow switches, is pressed.

The continuous flow switch as well as the proportional switch associated with the present auxiliary hydraulic control system are coupled to an electronic controller such that switch signals inputted to the controller will control activation and/or deactivation of the appropriate solenoid control valves used to control the flow of hydraulic fluid in the auxiliary hydraulic circuit. Based upon the signals inputted to the auxiliary electronic control module (ECM) from these switches, the auxiliary controller will output the appropriate control signals to the appropriate control solenoids. In this regard, besides being able to output continuous flow to the attachment motor in either direction, the present auxiliary hydraulic control system will also latch such continuous flow command at the selected flow level proportional to the force or pressure exerted on the bi-directional proportional switch in either direction. In other words, the continuous flow command can be latched at any flow level up to the maximum or full flow capabilities of the auxiliary hydraulic circuit in the selected direction.

The present system therefore enables an operator to select the particular direction of flow to the attachment or tool and thereafter command continuous flow in the selected direction to such attachment or tool at either a flow rate which is less than the maximum flow rate possible within the auxiliary circuit, or at the maximum flow rate, depending upon the particular attachment or tool, the work task and the particular application involved. This control system arrangement improves the overall capabilities of the auxiliary hydraulic circuit and enhances the longevity of the various system components by enabling the operator to control the amount of hydraulic fluid flow to a particular attachment or tool.

Although it is preferred that the bi-directional input switch for activating the auxiliary hydraulic circuit be a proportional switch as just described, it is recognized and anticipated that a momentary switch may likewise be used to perform these same functions without the ability to control the amount of hydraulic fluid flow to the attachment motor. In this case, this switch will function as an on/off switch to select fluid flow in either direction.

The auxiliary hydraulic circuit is typically enabled through the interlock control system associated with the particular work machine such as by meeting or fulfilling the specific operator restraint mechanism/seat switch criteria associated with the particular work machine, which switches are typically coupled to the interlock controller in some fashion. In this regard, the auxiliary hydraulic circuit along with the main hydraulic circuit controlling the implement control system will also typically be disabled by the interlock control system if the operator parameters established for the interlock control system are not maintained during normal operations. For example, the drive mechanism, implement control system and the auxiliary hydraulic control system are typically disabled if the arm rest or other operator restraint mechanism is moved out of its restraining position, or if the operator leaves the operator seat for a predetermined period of time when such systems are active. Because the auxiliary controller of the present invention is not tied or otherwise coupled to the interlock control system and operates separately and independently therefrom, it is therefore advantageous to likewise couple the arm rest or other operator restraint mechanism switch and the seat switch associated with the interlock system to the auxiliary controller such that the auxiliary controller can likewise be programmed to enable and disable the auxiliary hydraulic control system when the arm rest/seat switch criteria established for the interlock system is either fulfilled, or not fulfilled. Other switches or components coupled to the interlock controller and functioning as part of the interlock control system can likewise be coupled to the auxiliary controller as well and the auxiliary controller can likewise be programmed to operate in response to signal inputs from these other switches and/or components.

In another aspect of the present invention, the present auxiliary hydraulic control system is provided with an interlock override feature whereby continuous flow to the attachment or tool is allowed to remain active even though the operator is no longer present in the operator seat. Under certain operating conditions, it is desirable, and sometimes necessary, to have the operator exit the machine seat and further operate and/or manipulate the attachment or tool depending upon the particular job task. As such, the present interlock override feature includes an interlock override switch coupled to the auxiliary controller, which override switch must be used in conjunction with the continuous flow switch in order to allow the operator to exit the machine seat with the auxiliary hydraulics active in the continuous flow mode. In this regard, the override feature must be activated with the operator properly positioned in the seat with the arm rest or other operating restraint mechanism in its restraining position, and with the continuous flow function already enabled. When the auxiliary controller senses that the interlock override switch has been actuated, it will ignore inputs from the arm rest and seat switches likewise coupled to such controller so as to allow the continuous flow function to remain active even though the arm rest or other operator restraint mechanism has been moved out of its restraining position, or the operator has exited the operator seat. While in the override mode, the continuous flow function will remain energized until either the continuous flow switch, or the bi-directional flow switch controlling the direction of flow through the auxiliary hydraulic circuit is again actuated. The override function can likewise be terminated by again actuating the interlock override switch.

The present auxiliary hydraulic control system can be incorporated into any work machine in accordance with the teachings of the present invention.

BRIEF DESCRIPTION OF THE DRAWINGS

For a better understanding of the present invention, reference may be made to the accompanying drawings in which.

BEST MODE FOR CARRYING OUT THE INVENTION

A typical work machine incorporating the present auxiliary hydraulic control system would include some type of implement control system pivotally mounted to the main frame of the machine. Such implement control system may include one or more lift arms, or other articulated members, as well as one or more lift and/or tilt hydraulic cylinders for driving and controlling the operation of the implement system. Attachments or tools are typically mounted to the front of the lift arm assembly by means of an attachment or tool mount. As previously explained, a separate hydraulic system is used to actuate the implement system. Hydraulic lift cylinders which drive the lift arms with respect to the main frame of the machine and hydraulic tilt cylinders which drive the attachment mount with respect to the lift arms are supplied with hydraulic fluid by some type of implement hydraulic pump such as a constant displacement hydraulic pump. The flow of hydraulic fluid to the various valves and cylinders associated with the implement control system can be controlled through the use of one or more implement control levers, foot pedals, or an implement control joystick. Although the various embodiments of the present invention disclosed in FIGS. 1 and 2 illustrate use of an implement control joystick to control the implement system, it is recognized and anticipated that other means for actuating and controlling the implement system associated with a particular work machine, such as using conventional implement control levers mounted in the operator compartment, can likewise be utilized with the present auxiliary hydraulic control system without departing from the spirit and scope of the present invention.

Where a joystick is used to actuate and control a particular implement system, such joystick will typically be mounted on a console in the operator compartment so as to be easily grasped and manipulated by the machine operator. This implement control joystick would be linked to a plurality of valves which are actuated by movement of the joystick to control the flow of hydraulic fluid to, for example, the lift and tilt cylinders. This implement control joystick may be pushed in the forward, rearward, left and right directions to lower, raise, and tilt the attachment or tool back and forth. The extent to which the implement control joystick is pushed in a certain direction controls the amount of hydraulic fluid supplied to the lift and tilt cylinders, and therefore affects the speed and movement of the attachment or tool.

Figure 1:
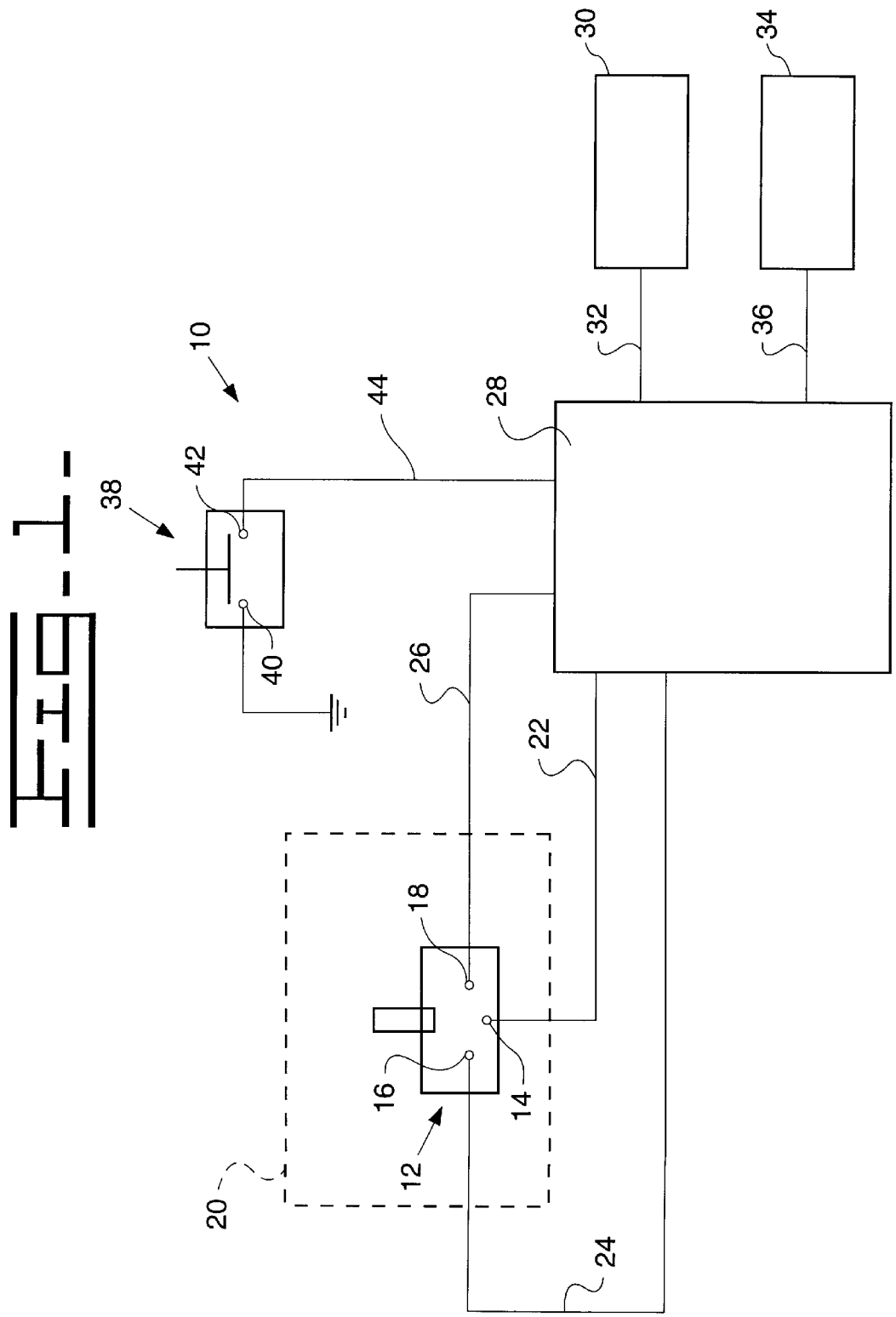
FIG. 1 is a schematic diagram of an auxiliary hydraulic control system constructed in accordance with the teachings of the present invention.
Figure 2:
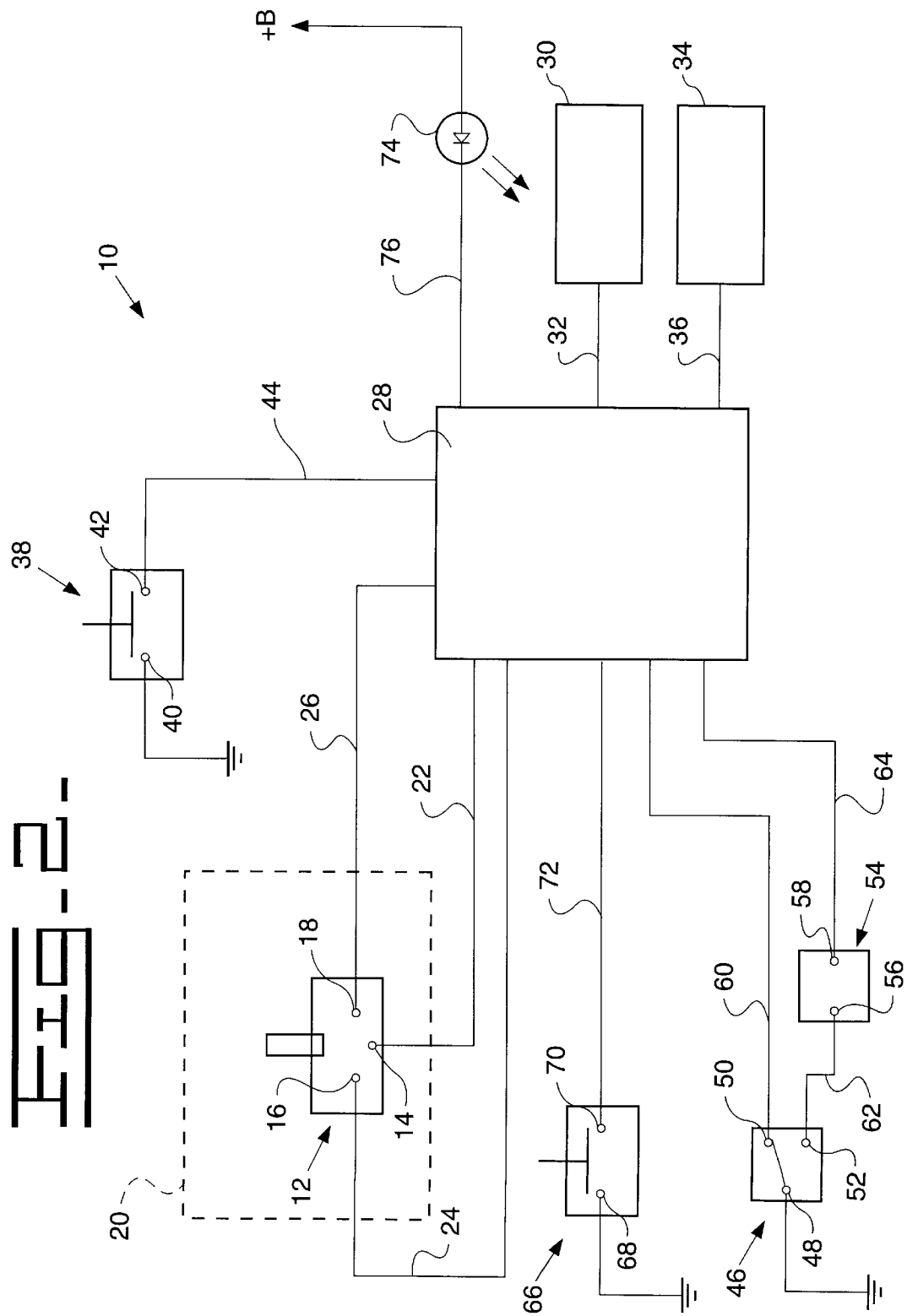
FIG. 2 is a schematic diagram of another embodiment of the auxiliary hydraulic control system constructed in accordance with the teachings of the present invention and incorporating an interlock override function.

Referring to FIG. 1, numeral 10 in FIG. 1 represents a preferred embodiment of the auxiliary hydraulic control system of the present invention. The auxiliary hydraulic control system 10 includes a normally centered bi-directional input device or switch 12, preferably a proportional switch, which is conventionally mounted or located on the implement control joystick 20 to facilitate use by the operator. The switch 12 is used to bi-directionally control the auxiliary hydraulic control valve (not shown) and is normally biased to a central position represented by contact 14 which is coupled to the auxiliary electronic control module (ECM) via conductive path 22. The bi-directional switch 12 likewise includes contacts 16 and 18, which contacts are likewise respectively coupled or otherwise attached to the auxiliary ECM 28 via conductive paths 24 and 26, depending upon whether switch 12 functions as a proportional switch or as an on/off switch as will be hereinafter explained. The switch 12 is used to control the bi-directional flow of hydraulic fluid in the auxiliary hydraulic circuit to the attachment or tool and, in the case where the switch 12 is a proportional switch, such switch will likewise control the amount or rate of hydraulic fluid flow to the attachment or tool in the selected direction as will be now explained.

If the bi-directional switch 12 is a proportional switch, such switch will include a force sensing resistor which normally rests in a relaxed neutral position represented by contact 14 in FIG. 1. This relaxed state is sensed by auxiliary ECM 28 via conductive path 22. Applying a force to one side of switch 12 will generate an output and subsequent hydraulic flow in one direction to the attachment or tool at a flow rate which is proportional to the force or pressure exerted on the switch, while applying a force to the opposite side of switch 12 will generate an output and subsequent flow in the opposite direction. For example, depending upon the particular type of proportional switch being utilized and the particular configuration of the ECM 28, conductive path 24 between switch contact 16 and ECM 28 may merely represent a ground connection and conductive path 26 between switch contact 18 and ECM 28 may represent the power supply to switch 12, such as an eight (8) volt power supply from ECM 28 to the switch. This means that all signal inputs from switch 12 in either switch direction will flow via conductive path 22 between switch contact 14 and ECM 28. In this situation, pushing switch 12 to the left, or towards contact 16, will input a signal to auxiliary ECM 28 via conductive path 22 to stroke the auxiliary valve in a first direction, thereby causing hydraulic fluid to flow to the front mounted attachment motor or actuator ina first, or forward (A1) direction. Pushing bi-directional switch 12 in the opposite direction to the right, such as towards contact 18, will likewise input a signal to auxiliary ECM 28 via conductive path 22 to stroke the auxiliary valve in such a manner so as to cause hydraulic fluid to flow to the front mounted attachment motor or actuator in a second, or reverse (A2) direction. The extent to which the proportional switch 12 is pushed in either the A1 or A2 direction will control the amount or rate of fluid flow supplied to the attachment's motor or actuator, and therefore the speed and movement of the attachment.

Based upon the input signals from bi-directional switch 12, the auxiliary ECM 28 will control output signals to proportional pilot pressure solenoids 30 and 34. These solenoids are used to modulate and control both the direction of the hydraulic fluid flow and the rate of such flow in the auxiliary hydraulic circuit, the A1 solenoid controlling flow in the A1 or forward direction whereas the A2 solenoid controls flow in the opposite A2 or reverse direction.

The solenoids 30 and 34 are used in a conventional manner to control the hydraulic flow to the auxiliary circuit and such solenoids are coupled to the auxiliary ECM 28 via conductive paths 32 and 36 as illustrated in FIGS. 1 and 2. The proportional solenoids 30 and 34 are typically controlled by the force or pressure applied to the proportional switch input. For example, applying a force or pressure towards contact 16 of switch 12 will result in the auxiliary ECM 28 outputting a signal via conductive path 32 to energize the A1 solenoid 30, the solenoid 30 being energized proportional to the force or pressure applied. In similar fashion, applying a force or pressure towards contact 18 of switch 12 will result in the auxiliary ECM 28 outputting a signal via conductive path 36 to energize the A2 solenoid 34, the solenoid 34 being energized proportional to the force or pressure applied. In this regard, once the switch deadband in either the A1 or A2 direction has been exceeded, the current to the appropriate solenoid 30 or 34 will be commanded to a threshold level. The current to the appropriate solenoid will continue to increase as more force or pressure is applied to the respective side of switch 12. Maximum current will be obtained when maximum force is applied. Releasing the switch 12 will allow the switch to return to the neutral position, turning off current to the respective solenoid.

The proportional switch 12 will produce a pulse width modulated (PWM) signal with a range of 5% to 95% duty cycle, with 50% duty cycle resulting in zero current being outputted to both the A1 and A2 solenoids 30 and 34. The amount of current outputted to the solenoids 30 and 34 is therefore indicative of or corresponds to a particular flow rate being commanded and the force or pressure on switch 12 in the A1 or A2 direction is indicative of or corresponds to the amount of current flowing to the appropriate solenoid 30 or 34. In this configuration, the duty cycle range of 5% to 95% will be allocated as follows, with the 50% duty cycle resulting in zero current being outputted to the A1 and A2 solenoids 30 and 34. Actuating switch 12 to the left, or towards contact 16, will input a signal to ECM 28 via conductive path 22 representative of the 5% to 50% duty cycle range of switch 12, such signal being indicative of outputting a signal to the A1 solenoid 30 proportional to the amount of force or pressure being exerted in the A1 direction as previously explained. Similarly, actuating switch 12 to the right, or towards contact 18, will input a signal to ECM 28 via conductive path 22 representative of the 50% to 95% duty cycle range of switch 12, such signal being indicative of outputting a signal to the A2 solenoid proportional to the amount of force or pressure being exerted in the A2 direction.

In the case where bi-directional switch 12 is merely an on/off switch in both the A1 and A2 directions, pushing switch 12 to the left, or towards contact 16, will input a signal to auxiliary ECM 28 via conductive path 24 to stroke the auxiliary valve in the A1 direction, thereby causing hydraulic fluid to flow to the front mounted attachment motor or actuator in such direction. Similarly, pushing bi-directional switch 12 in the opposite direction to the right, such as towards contact 18, will input a signal to auxiliary ECM 28 via conductive path 26 to stroke the auxiliary valve in such a manner so as to cause hydraulic fluid to flow to the front mounted attachment motor or actuator in the reverse or A2 direction. In this particular switch configuration, conductive path 22 between switch contact 14 and ECM 28 will merely represent a ground connection and no signals will be inputted to ECM 28 via path 22. Also, since switch 12 in this particular application merely functions as an on/off switch, the rate of fluid flow to the attachment or tool in the selected direction will be fixed at a predetermined rate and the operator will have no ability to control the rate of such flow in either the A1 or the A2 direction. Other switch and ECM connections and configurations are also possible.

Regardless of the switch/ECM configuration and/or connection, auxiliary ECM 28 will constantly sense and monitor the position of the bi-directional flow switch 12 via any one or more of the conductive paths 22, 24 and 26. As a result, based upon the signal inputted from switch 12 to auxiliary ECM 28, ECM 28 will output a signal via conductive path 32 or 36 to the appropriate solenoid 30 or 34 to actuate and control the flow of hydraulic fluid in the selected A1 or A2 direction.

Since the operation of a particular attachment or tool does not always require that maximum hydraulic fluid flow be provided to the attachment or tool, use of the bi-directional proportional switch 12 enables an operator to select not only the particular direction of the fluid flow, namely, either forward or reverse flow, but it likewise affords the operator the additional capability of selecting a fluid flow rate in the selected direction which is less than the maximum possible fluid flow and optimal for the particular attachment or tool and the particular task being performed. Nevertheless, it is also recognized and anticipated that switch 12 may likewise be a momentary switch instead of a proportional switch. In this particular case, the bi-directional switch 12 will function as an on/off switch to select fluid flow in either the A1 or A2 direction and switch 12 will operate in conjunction with auxiliary ECM 28 in substantially the same manner as previously explained except that the operator will no longer have the ability to control the amount or rate of hydraulic fluid flow in the selected direction to the particular attachment. Similarly, in this particular configuration, solenoids 30 and 34 can be of the conventional type and no longer need to be proportional pressure solenoids. In all other respects, the construction and operation of the auxiliary hydraulic control system 10 would be the same as described above.

Under certain operating conditions, it is desirable to have continuous fluid flow to the attachment or tool without having to continuously hold the bi-directional switch 12 in one direction or the other. In this regard, a momentary continuous flow switch 38 is provided to activate the continuous flow function in the selected direction. Switch 38 is likewise located in the operator compartment and can likewise be positioned on the implement control joystick to even further facilitate its use by the operator. The continuous flow switch 38 includes a pair of contacts 40 and 42, contact 40 being grounded as shown in FIGS. 1 and 2 and contact 42 being coupled to the auxiliary ECM 28 via conductive path 44. Actuation of the continuous flow switch 38 will input a signal to the auxiliary ECM 28 and, based upon such input, ECM 28 will output a signal to either the A1 solenoid 30 or the A2 solenoid 34 via conductive paths 32 or 36 to output the selected hydraulic fluid flow rate on a continuous basis if certain additional parameters are satisfied as will be hereinafter explained.

Since the continuous flow switch 38 is a momentary switch, it will remain closed against contacts 40 and 42 for as long as such switch is held by the operator in its engaged or depressed state, and switch 38 will return to its open state upon release by the operator. As a result, auxiliary ECM 28 will not look at the specific state of switch 38 via conductive path 44, but instead, upon each actuation of switch 38, ECM 28 is programmed to sense when switch 38 goes from an open state to its closed state, that is, it will sense the rising edge of the signal inputted via conductive path 44, regardless of how long switch 38 is held in its engaged or depressed state.

The continuous flow function of the present auxiliary hydraulic control system 10 can be activated or enabled in the following manner. With the bi-directional switch 12 engaged and held in the selected direction of flow, the operator must actuate the continuous flow switch 38 and thereafter release the bi-directional switch 12 within a predetermined period of time, such as within one second. When switch 38 is actuated a first time, auxiliary ECM 28 will sense such activation and begin to look for a signal via conductive path 22, 24 or 26 indicative of the fact that the bi-directional switch 12 has been released within the appropriate time period. If the prescribed time period expires, the continuous flow command initiated by switch 38 will be ignored and flow will continue in the selected direction in accordance with the activation of the bi-directional switch 12. On the other hand, if auxiliary ECM 28 senses release of the bi-directional switch 12 within the prescribed time period after a first actuation of switch 38, ECM 28 will latch the current being outputted to the appropriate solenoid 30 or 34 and continue to output such current via the appropriate conductive path 30 or 36 on a continuous basis. In this regard, it should be noted that if the bi-directional switch 12 is a proportional switch, continuous flow can be latched at the selected flow rate proportional to the force or pressure being exerted on the bi-directional switch 12 in the selected direction. On the other hand, if the bi-directional switch 12 is a momentary switch, the continuous flow command will be latched at a predetermined maximum flow level in the selected direction. Once the continuous flow function has been activated or enabled, deactivation or disengagement of the continuous flow function can be accomplished by again pressing the bi-directional switch 12 in either direction, or by a subsequent actuation of switch 38. Additional signal inputs from either switch 12 or switch 38 will be sensed by auxiliary ECM 28 and the latching command to either solenoid 30 or 34 will be terminated.

Depending upon the programming of ECM 28, and although actuation of switch 38 will set the continuous flow command, the logic of ECM 28 may require switch 38 to be physically released before switch 12 is released to engage the continuous flow function. Regardless of such configuration, the present invention is intended to cover both of the above-described situations, that is, the situation where mere actuation of the switch 38, regardless of how long such switch is held in its engaged or depressed state, followed by a release of switch 12 within the prescribed time period will engage continuous flow in the selected direction as well as the situation when the operator must press and release the continuous flow switch 38 and thereafter release switch 12 within the prescribed time period in order to activate continuous flow in the selected direction.

Electronic controllers or modules such as ECM 28 are commonly used in association with work machines for accomplishing various tasks. In this regard, ECM 28 will typically include processing means, such as a microcontroller or microprocessor, associated electronic circuitry such as input/output circuitry, analog circuits or programmed logic arrays, as well as associated memory. Auxiliary ECM 28 can therefore be programmed to sense and recognize the appropriate signals indicative of the various conditions, states or actuations of the switches 12 and 38, such as signals indicative of the force or pressure exerted on the bi-directional switch 12 when such switch is a proportional switch, or the signals indicative of the on/off function of switch 12 when such switch functions in such capacity, or the signals indicative of the actuation of switch 38, or the signals indicative of the release of switch 12. In addition, ECM 28 can be programmed to latch the continuous flow command inputted by switch 38 when all of the above-identified conditions and parameters for enabling the continuous flow function have been satisfied. The present auxiliary hydraulic control system 10 therefore enables an operator to select the particular direction of flow based upon activation of the bi-directional switch 12 and thereafter latch the continuous flow command to the appropriate solenoid in the selected direction at either a flow rate which is less than the maximum flow rate possible within the auxiliary hydraulic circuit, or at the maximum flow rate, depending upon the particular attachment or tool and the particular work task being performed.

When incorporated into a particular work machine, the present auxiliary hydraulic control system 10 could be typically enabled through the interlock control system associated with the particular work machine. Most interlock control systems in use today require that the operator be present in the seat and properly restrained before enabling various systems such as the drive mechanism and the implement control system. As such, interlock control systems typically include a seat switch and an operator restraint switch such as an arm rest switch which are coupled to the interlock controller to selectively lock out or enable the appropriate systems based upon the arm rest/seat switch criteria established for that particular interlock system. In this regard, since the auxiliary hydraulic circuit is typically enabled along with the main hydraulic circuit controlling the implement control system, and since the auxiliary ECM 28 associated with the present invention is in no way tied or otherwise connected to any other controller including any interlock controller, enablement of the implement control system will not automatically enable the auxiliary hydraulic control system 10 unless the arm rest/seat switch criteria is likewise inputted into the auxiliary ECM 28. To afford this capability, another aspect of the present invention is illustrated in FIG. 2 wherein signal inputs from arm rest switch 46 and seat switch 54 are inputted into the auxiliary ECM 28 such that ECM 28 can be programmed to enable and disable the auxiliary hydraulic control system 10 based upon the same arm rest/seat switch criteria used by the interlock controller to enable and disable the implement control system. As a result, if the particular arm rest/seat switch criteria established for the interlock controller is satisfied, auxiliary ECM 28 will enable the auxiliary hydraulic control system 10 separate and apart from the interlock control system. Similarly, if the arm rest/seat switch criteria established for the interlock controller is not satisfied or maintained during normal operations, and the interlock controller disables the implement control system, the auxiliary ECM 28 will likewise disable the auxiliary hydraulic control system 10 based upon the same signal inputs from switches 46 and 54.

As illustrated in FIG. 2, the arm rest switch 46 and the seat switch 54 are wired or coupled in series as shown such that the switch signals inputted to the auxiliary ECM 28 are tied together in a particular manner. Although the particular arm rest/seat switch circuit configuration illustrated in FIG. 2 is generally preferred, it is recognized and anticipated that other circuit arrangements including wiring or coupling arm rest switch 46 and seat switch 54 to ECM 28 in a parallel arrangement will likewise work equally as well. In this regard, the arm rest/seat switch circuit configuration utilized in conjunction with auxiliary ECM 28 should be substantially identical to or at least compatible with the arm rest/seat switch circuit configuration utilized in conjunction with the interlock controller.

In the FIG. 2 embodiment, arm rest switch 46 is a non-contacting proximity switch which comprises a single pole 48, double throw reed switch having contacts 50 and 52 which are activated by a magnet (not shown). As the magnet passes in proximity to reed switch 46, the switch changes states thereby changing the signal output. In a particular work machine such as a skid steer loader, the arm rest switch 46 and its harness can be packaged and mounted to a rear mounting bracket associated with the arm rest mechanism. The magnet itself can be positioned and located on the arm rest such that when the arm rest is moved back and forth between its up or out-of-the-way position and its down or operative restraining position, the magnet will come in proximity to the switch 46 thereby changing the state of the switch contacts. Although the single pole, double throw reed switch illustrated in FIG. 2 is generally preferred, it is also recognized and anticipated that other types of proximity switches such as a double pole, single throw switch as well as non-proximity switches may likewise be utilized in place of switch 46 without departing from the spirit and scope of the present invention.

As shown in FIG. 2, the arm rest (switch 46 is in a normally closed position against contact 50 when the arm rest is in its up position, pole 48 and contact 50 thereby providing a first set of normally closed contacts. Contact 50 is connected to auxiliary ECM 28 via conductive path 60 such that ECM 28 will constantly sense and detect the arm rest up position. As shown in FIG. 2, the signal from arm rest: switch 46 via conductive path 60 is closed and grounded. On the other hand, seat switch 54 is a pressure actuated momentary switch that is normally open as shown in FIG. 2 and closes when the operator is seated in the seat. In this regard, contact 52 of arm rest switch 46 is connected in series via conductive path 62 to contact 56 of seat switch 54, and contact 58 of seat switch 54 is connected directly to the auxiliary ECM 28 via conductive path 64. When the arm rest is moved to its down or operative restraining position, switch 46 will be moved away from its normally closed position against contact 50 and into electrical contact with contact 52. In this situation, pole 48 and contact 52 provide a second set of normally open contacts. When the machine operator is seated in the seat, seat switch 54 will be moved to its closed position thereby completing the circuit via conductive paths 62 and 64 to the ECM 28. When these two operator conditions or parameters are met, the signal from arm rest switch 46 via conductive path 60 to ECM 28 is open and the signal from the seat switch 54 to ECM 28 is closed. If the arm rest/seat switch criteria as just explained has been met, interlock ECM will typically be programmed to enable the implement control system as well as other systems. Based upon these same signal inputs from switches 46 and 54, auxiliary ECM 28 will likewise allow signals to be outputted to solenoids 30 and 34, when appropriate, to energize the same thereby enabling the auxiliary hydraulic control system.

Based upon the particular arm rest/seat switch circuit configuration illustrated in FIG. 2, auxiliary ECM 28 will read both states of the arm rest switch 46 and will continuously sense or detect whether the arm rest is either in or out of its up position, but will only sense or detect the arm rest in its down position when the operator is positioned in the seat. This particular arm rest/seat switch circuit configuration also enables ECM 28 to be coupled to such switches 46 and 54 so as to be operable to receive a signal indicative of when the arm rest switch 46 is either in or out of its first state, or its non-restraining position, and a signal indicative of when the arm rest and seat switches 46 and 54 are either concurrently in their second state, or at least one of such switches is out of or is not in its second state. Based upon signals received from the arm rest and seat switches, ECM 28 is further operable to enable and disable the solenoids 30 and 34. Although preferred, other arm rest/seat switch circuit configurations will work equally as well with the present auxiliary hydraulic control system 10 so long as such circuit configuration is compatible with the arm rest/seat switch criteria established for the interlock control system.

With the arm rest switch 46 and seat switch 54 coupled to the auxiliary ECM 28 in the manner described above with respect to FIG. 2, it should be recognized that if either the arm rest switch 46 or the seat switch 54 moves to its opened position during normal operation of the work machine indicating that either the arm rest is out of its restraining position, or that the operator has left the seat, auxiliary ECM 28 will likewise be programmed, similar to the interlock controller, to de-energize the solenoids 30 and 34 thereby disabling the auxiliary hydraulic control system 10. Coupling the arm rest switch and the seat switch to the auxiliary ECM 28 therefore provides an additional level of safety to the operation of the auxiliary hydraulic control system based upon the operator safety parameters established for the interlock control system and such arrangement likewise obviates the need for other system components for activating and deactivating the auxiliary hydraulic circuit such as a mode select switch and/or an auxiliary circuit on/off switch.

Nevertheless, under certain operating conditions, it is desirable, and sometimes necessary, to have the operator exit the machine seat and further operate and/or manipulate the particular attachment or tool depending upon the particular job task. In another aspect of the present invention as further illustrated in FIG. 2, the present auxiliary hydraulic control system 10 further includes an interlock override switch 66 located in the operator compartment, the switch 66 being used in conjunction with the continuous flow switch 38 so as to allow the operator to exit the machine seat with the auxiliary hydraulic circuit active in the continuous flow mode. Like switch 38, the interlock override switch 66 is a momentary switch and includes a pair of contacts 68 and 70, contact 68 being grounded as shown in FIG. 2 and contact 70 being coupled to the auxiliary ECM 28 via conductive path 72. Actuation of the switch 66 will input a signal to the auxiliary ECM 28 and, based upon such input, ECM 28 will be programmed to ignore all signal inputs via conductive paths 60, 62 and 64 from the arm rest switch 46 and seat switch 54 so as to allow the continuous flow function to remain active even though the arm rest or other operator restraint mechanism has been moved out of its restraining position, and/or the operator has exited the machine seat. In this regard, the auxiliary ECM 28 is programmed to output the override command only if the override switch 66 is actuated while the operator is present in the seat with the arm rest or other operator restraint mechanism in its down or restraining position, and the continuous flow function is already enabled through use of the continuous flow switch 38 as previously explained.

Once the interlock override mode has been actuated, the auxiliary ECM 28 will continue to latch and energize the appropriate solenoid 30 or 34 in the continuous flow mode until either the continuous flow switch 38, or the bi-directional flow switch 12 is again actuated. The override function can likewise be terminated by again actuating the interlock override switch 66. Since switch 66 is a momentary switch, as previously explained with respect to momentary switch 38, the auxiliary ECM 28 is programmed to sense when switch 66 goes from an open state to its closed state, that is, ECM 28 will sense the rising edge of the signal inputted via conductive path 72. Still further, this embodiment of the present auxiliary hydraulic control system may likewise include an interlock override lamp or other warning or alerting device such as the diode indicator assembly 74 illustrated in FIG. 2. The interlock override lamp 74 is used to indicate the status of the interlock override function of the present system as actuated through switch 66. The lamp assembly 74 is connected to the auxiliary ECM 28 via conductive path 76 and will illuminate whenever the interlock override function is active. An illuminated indicator therefore indicates that the override function has been activated and the operator may exit the machine seat with the auxiliary hydraulic circuit active. When the override function is terminated, the override lamp or indicator 74 will be extinguished.

With the interlock override switch 66 engaged or active, it should be recognized that as soon as the arm rest is raised to its non-restraining position, or as soon as the operator leaves the machine seat for a period of time greater than the debounce time, the interlock control system will typically disable the implement control system and the drive mechanism of the work machine because these systems as well as the arm rest/seat switches are tied directly to the interlock controller. On the other hand, the interlock override switch 66 as well as the control of the auxiliary hydraulic circuit are not tied to any interlock controller, but instead, are only coupled to the auxiliary ECM 28. As a result, although other systems will typically be disabled through the interlock controller, the only system operating in the interlock override mode will be the auxiliary hydraulic circuit.

As with all switches, it is recognized and anticipated that the input signals from switches 12, 38, 46, 54 and 66 can all be conditioned for a certain period of time such that the auxiliary ECM 28 will debounce the particular switch input for a predetermined period of time before recognizing the signal and taking specific action. It is also recognized and anticipated that other types of switches can be utilized in conjunction with the present invention so long as such switches are configured such that the auxiliary ECM 28 will be able to monitor and sense when the arm rest is in its restraining position, when the operator is seated in the machine seat, when the bi-directional flow switch 12 has been actuated in a selected direction and, if such switch is a proportional switch, signals indicative of the amount of force or pressure exerted on such switch, and when the continuous flow switch 38 and the interlock override switch 66 have been actuated. In addition, it is also recognized and anticipated that other arm rest/seat switch circuit configurations can be utilized to allow the auxiliary ECM 28 to sense the proper arm rest/seat switch criteria. Still further, it is recognized that other types of operator restraint systems may likewise be utilized in place of the arm rest system discussed above. For example, a seat belt or shoulder harness arrangement may be used and the arm rest switch 46, or some other type of switch, can be adapted for use with such other restraint device by wiring or otherwise coupling such switches to ECM 28 to produce the desired result.

Industrial Applicability

As described herein, the present auxiliary hydraulic control system 10 has particular utility in certain types of work machines such as skid steer loaders, wheel loaders, backhoe loaders and track loaders to control the operation of certain attachments or tools which are mounted to such machines as previously explained.

Figure 3A:
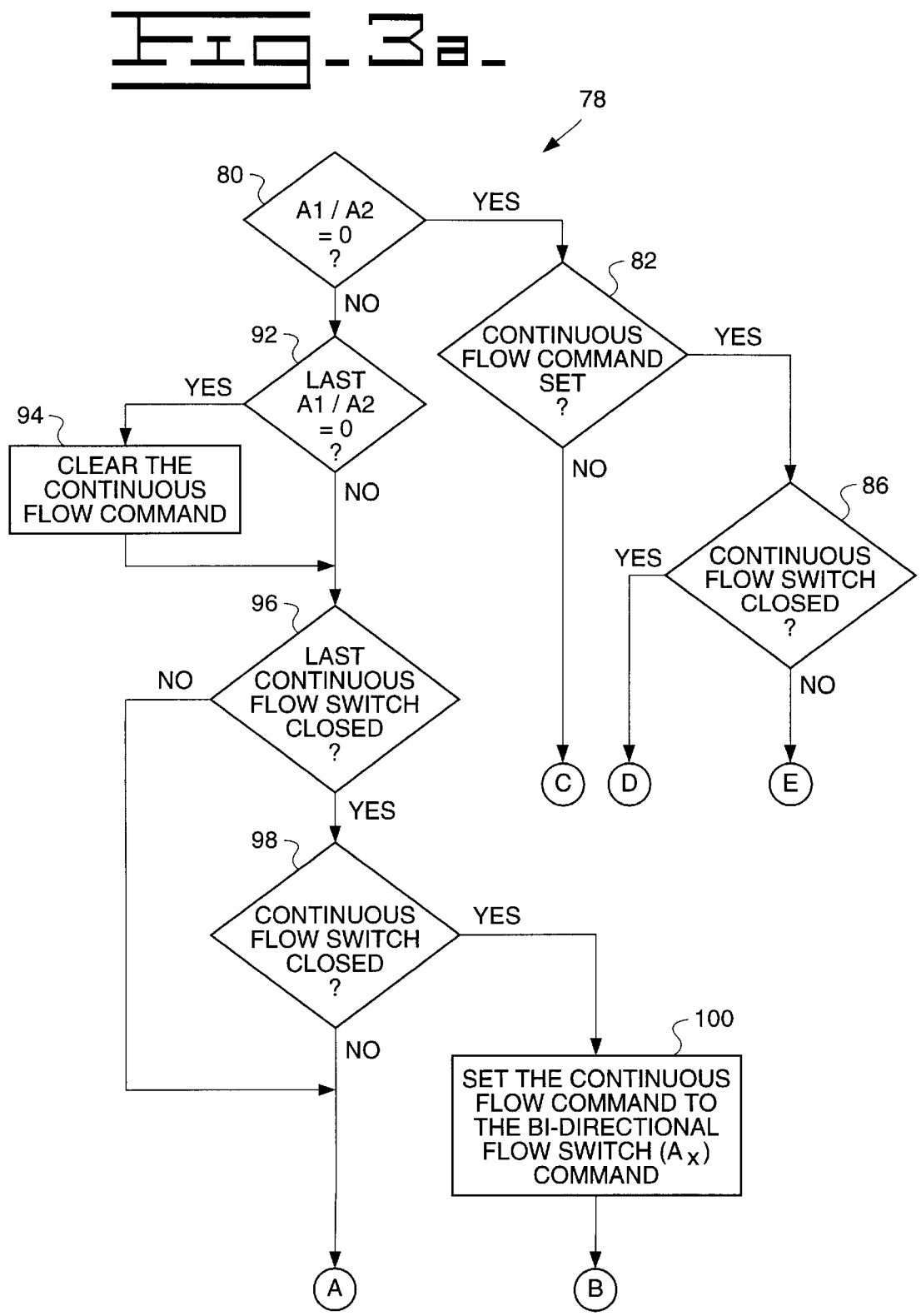
FIGS. 3A and 3B are flowcharts of operating steps for the auxiliary hydraulic control system of FIGS. 1 and 2 constructed in accordance with the teachings of the present invention.
Figure 3B:
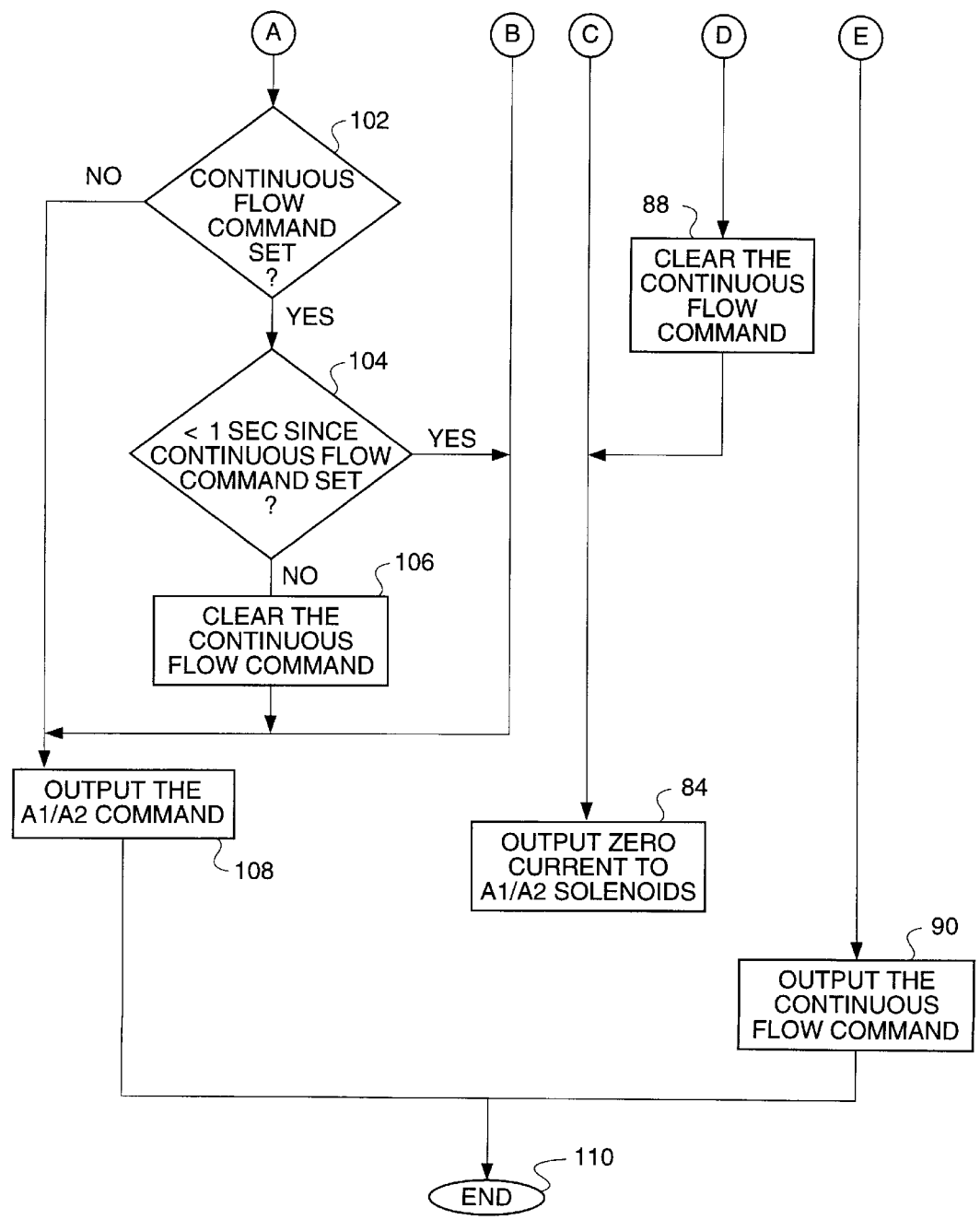

An example of operation in accordance with one aspect of the present invention is set forth in the flowchart illustrated in FIGS. 3A and 3B. The operating steps as set forth in control loop 78 can be incorporated into the programming of the processing means of auxiliary ECM 28 by techniques well known to those of ordinary skill in the art. The operating steps of flowchart 78 are initiated and operable after power has been applied to ECM 28 and such steps can be repeated at any predetermined rate or interval such as every 15 milliseconds (ms).

Once control loop 78 is initiated, auxiliary ECM 28, at step 80, will look to see if the bi-directional switch 12 has been actuated in either the A1 or A2 direction. The term A1/A2=O in block 80 means that switch 12 has not been actuated. If switch 12 has not been actuated, ECM 28 will then check to see if the continuous flow command had been previously set or initiated prior to the current loop at step 82. In other words, ECM 28 is checking to see if the continuous flow switch 38 had been previously actuated prior to this loop. If ECM 28 determines at step 82 that the continuous flow command had not been previously set, it will then output zero current to the A1/A2 solenoids 30 and 34 at step 84 illustrated in FIG. 3B thereby de-energizing the same. Control loop 78 would then terminate at step 110 in FIG. 3B.

If, on the other hand, at step 82, ECM 28 determines that the continuous flow command had been previously set prior to the current loop, ECM 28 would then look to see if the continuous flow switch 38 had been actuated or closed during the current loop at step 86 (FIG. 3A). If the auxiliary ECM 28 senses that the continuous flow switch 38 has been closed on this loop, it will then clear the continuous flow command at step 88 (FIG. 3B) and output zero current to the previously energized A1 or A2 solenoid thereby de-energizing the same. Control loop 78 would then terminate at step 110. On the other hand, if ECM 28 determines that the continuous flow switch 38 has not been activated or closed on this current loop, it will continue to output the continuous flow command previously initiated or set during a prior loop at step 90 (FIG. 3B), and control loop 78 would again terminate as indicated at step 110.

Returning to step 80 (FIG. 3A) of control loop 78, if the auxiliary ECM 28 determines that the bi-directional switch 12 has in fact been actuated, ECM 28 will then look to see if the bi-directional A1/A2 switch had been actuated during a previous loop at step 92. If switch 12 had not been previously activated, ECM 28 would again clear any previous continuous flow command at step 94 and then move on to step 96 to see if the continuous flow switch 38 was actuated on the last loop. Clearing a previous continuous flow command at step 94 covers the particular scenario where the continuous flow function is active and, at step 80, the bi-directional flow switch 12 is actuated in either direction to terminate the same as previously explained.

If the auxiliary ECM 28, at step 96, determines that the continuous flow switch 38 was activated during the last loop, it will skip step 98 and proceed to step 102 (FIG. 3B). If, on the other hand, ECM 28 determines that the switch 38 was not actuated during the prior loop, it will then check to see, at step 98, if switch 38 was actuated to its closed position during this particular loop. If this is so, ECM 28 will then set the continuous flow command at step 100 (FIG. 3A) based upon the input from switch 12, whether the switch 12 input is an on/off input or a proportional input as previously explained, and ECM 28 will continue to output the appropriate command to the A1 or A2 solenoid 30 or 34 based upon the input from switch 12 at step 108 (FIG. 3B). Control loop 78 will then terminate at step 110. It should be recognized that steps 100 and 108 in control loop 78 occur within the one second time period established for releasing the bi-directional switch 12 after the continuous flow switch 38 has been actuated. As a result, outputting the continuous flow command to solenoids 30 and 34 will not take place during the same loop. Instead, if the bi-directional flow switch 12 is released within the one second time period, or any other time period established for initiating the continuous flow command, such determination will be made at step 80 during a subsequent loop and actuation of the continuous flow function will follow via steps 82, 86 and 90.

Returning to step 98 (FIG. 3A) of control loop 78, if the auxiliary ECM 28 determines that the continuous flow switch 38 has not been actuated during the current loop, at step 102 illustrated in FIG. 3B, ECM 28 will determine if the continuous flow command outputted by switch 38 had been previously initiated or set during a prior loop. If the continuous flow command had not been previously initiated via switch 38, ECM 28 will continue to output a command to the appropriate A1 or A2 solenoids 30 or 34 based upon the current activation of bi-directional flow switch 12 at step 108, and control loop 78 will again terminate at step 110.

On the other hand, if the auxiliary ECM 28 determines, at step 102, that the continuous flow command had been previously initiated or set via switch 38 during a prior loop, ECM 28 will then check to see if the prescribed time period for releasing the bi-directional flow switch 12 after actuation of switch 38 has expired at step 104. In control loop 78, this prescribed or predetermined time period has been established to be one second. Therefore, at step 104, if ECM 28 determines that the total time that has elapsed since the continuous flow command had been set via switch 38 has exceeded the one second time period, then ECM 28 will clear the continuous flow command at 106 (FIG. 3B) and will continue to output the appropriate command to the A1 or A2 solenoids 30 or 34 based upon the inputs received from the bi-directional flow switch 12 at step 108. Control loop 78 will again terminate at step 110.

If, on the other hand, at step 104 (FIG. 3B), the auxiliary ECM 28 determines that the total time elapsed is less than the one second time period established for releasing switch 12 after activation of switch 38, then ECM 28 will continue to output the appropriate command to the selected A1 or A2 solenoid 30 or 34 and control loop 78 will terminate at step 110.

Once control loop 78 has completed a particular cycle, this process will be repeated based upon a predetermined repeat interval so that auxiliary ECM 28 will constantly monitor the signal inputs received from switches 12 and 38. Because control loop 78 is typically repeated every 15 ms, multiple loops will be accomplished between the time that the continuous flow command is initiated or set via actuation of switch 38 and the time that the bi-directional flow switch 12 is released within the predetermined time period in order to activate the continuous flow function.

It is recognized that variations to the steps depicted in flowchart 78 could be made without departing from the spirit and scope of the present invention. In particular, steps could be added or some steps could be eliminated. All such variations are intended to be covered by the present invention. It is also recognized that in most applications an auxiliary hydraulic control system including ECM 28 may include a variety of other switches, solenoids, relays, indicators, sensors and other control apparatus.

Auxiliary ECM 28 is therefore operable to allow an operator to select continuous flow in either a forward or a reverse direction, and to select such continuous flow at a flow rate which is proportional to the maximum flow rate if so desired. In addition, the auxiliary ECM 28 will likewise enable an operator to override inputs from a typical operational state sensor associated with a particular work machine, such as inputs from an arm rest switch and a seat switch, so as to allow the continuous flow function to remain active even though the operator raises the arm rest or otherwise releases the operating restraint mechanism and exits the machine seat.

Other aspects, objects and advantages of the present invention can be obtained from a study of the drawings, the disclosure and the appended claims.

What is claimed is:

1. A control system for controlling the flow of hydraulic fluid within an auxiliary hydraulic circuit associated with a work machine wherein the work machine includes an implement system and an auxiliary hydraulic circuit for controlling the operation of certain attachments or tools which are mountable to the implement system, said auxiliary hydraulic control system comprising:

a first switch actuatable to control the direction of fluid flow within the auxiliary hydraulic circuit, said first switch being actuatable in a first manner to output a signal indicative of directing flow in a first direction within the auxiliary hydraulic circuit and said first switch being actuatable in a second manner to output a signal indicative of directing flow in a second direction within the auxiliary hydraulic circuit, said first switch outputting said signals for directing flow in one of said first and second directions for as long as said switch is held in its actuated position;

a second switch actuatable to output a signal indicative of providing continuous flow in one of said first and second directions within the auxiliary hydraulic circuit based upon the direction of flow selected by actuation of said first switch;

an electronic controller coupled to said first and second switches for receiving signals therefrom, said controller being operable to receive a signal corresponding to said first switch being actuated in one of said first and second manners, a signal corresponding to said second switch being actuated, and a signal corresponding to when said first switch has been released;

said controller outputting a signal to initiate continuous flow within the auxiliary hydraulic circuit in one of said first and second directions when said controller receives the signal corresponding to said first switch being actuated to direct flow in one of said first and second directions, the signal corresponding to said second switch being actuated to provide continuous flow in the selected direction, and the signal corresponding to said first switch being released within a predetermined period of time after said second switch has been actuated.

2. The control system, as set forth in claim 1, wherein said first switch is a bi-directional momentary switch.

3. The control system, as set forth in claim 1, wherein said predetermined period of time is one second.

4. The control system, as set forth in claim 1, wherein said controller outputs a signal to discontinue continuous flow in the selected direction within the auxiliary hydraulic circuit when said controller receives a signal corresponding to a subsequent actuation of said first switch.

5. The control system, as set forth in claim 1, wherein said controller outputs a signal to discontinue continuous flow in the selected direction within the auxiliary hydraulic circuit when said controller receives a signal corresponding to a subsequent actuation of said second switch.

6. The system, as set forth in claim 1, wherein said second switch is a momentary switch.

7. The control system, as set forth in claim 1, wherein said first switch is a bi-directional proportional switch having opposed sides, applying a force to one side of said proportional switch outputting a signal indicative of directing flow in a first direction within the auxiliary hydraulic circuit at a flow rate which is proportional to the amount of force exerted on the one side of said switch up to a maximum flow rate, and applying a force to the opposite side of said proportional switch outputting a signal indicative of directing flow in a second direction within the auxiliary hydraulic circuit at a flow rate which is proportional to the amount of force exerted on the opposite side of said switch up to a maximum flow rate.

8. The control system, as set forth in claim 7 above, wherein said second switch is actuatable to output a signal indicative of providing continuous flow in one of said first and second directions within the auxiliary hydraulic circuit at the same flow rate dictated by the actuated position of said first switch when said second switch is actuated.

9. The control system, as set forth in claim 1, wherein the work machine includes an operator restraint mechanism and an operator seat, said auxiliary hydraulic control system further including:

a third switch coupled to the operator restraint mechanism and actuatable between a first state corresponding to the condition when said operator restraint mechanism is in a non-restraining condition and a second state corresponding to the condition when said operator restraint mechanism is in a restraining condition;

a fourth switch coupled to the operator seat and actuatable between a first state corresponding to the condition when an operator is not present in the seat and a second state corresponding to the condition when an operator is present in the seat; and a fifth switch actuatable to override certain signal inputs to said controller;

said controller coupled to said third, fourth and fifth switches for receiving signals therefrom, said controller being operable to receive a signal indicative of when said third switch is in its first or second state, a signal indicative of when said fourth switch is in its first or second state, and a signal indicative of when said fifth switch has been actuated;

said controller being capable of outputting a signal to discontinue continuous flow when said controller receives a signal indicative of said third switch being in its first state;

said controller being capable of outputting a signal to discontinue continuous flow when said controller receives a signal indicative of said fourth switch being in its first state;

said controller outputting a signal to continue continuous flow in the selected direction regardless of the signals received from said third and fourth switches when said controller receives a signal indicative of said fifth switch being actuated.

10. An auxiliary hydraulic control system for controlling the operation of an attachment or tool mounted to a work machine wherein the work machine includes an implement system, the attachment or tool being mountable to the implement system, and an auxiliary hydraulic circuit operable to provide hydraulic fluid flow to the attachment or tool, said auxiliary hydraulic system comprising:

a bi-directional proportional input device actuatable to control the direction of flow within the auxiliary hydraulic circuit, said input device being actuatable in one direction so as to generate a signal corresponding to directing fluid flow in a first direction at a flow rate which is proportional to the amount of pressure exerted on said input device in said one direction, said input device being actuatable in another direction so as to generate a signal corresponding to directing fluid flow in a second direction at a flow rate which is proportional to the amount of pressure exerted on said input device in said another direction;

a continuous flow switch actuatable to generate a signal to provide continuous flow in one of said first and second directions within the auxiliary hydraulic circuit at the selected flow rate based upon the direction of flow and the flow rate selected by actuation of said bi-directional input device;

and an electronic controller coupled to said bi-directional input device and to said continuous flow switch to receive signals therefrom, said controller being operable to receive a signal from said bi-directional input device indicative of said input device being actuated in one of said first and second directions at a particular flow rate depending upon the amount of pressure being exerted on said input device in the selected direction, a signal indicative of said continuous flow switch being actuated, and a signal indicative of when said bi-directional input device has been released;

said controller outputting a signal to initiate continuous flow within the auxiliary hydraulic circuit in one of said first and second directions and at the particular flow rate directed by said bi-directional input device at the time said continuous flow switch was actuated when said controller receives the signal indicative of said bi-directional proportional input device being actuated in one of said first and second directions at a particular flow rate, the signal indicative of said continuous flow switch being actuated to provide continuous flow in the selected direction at the selected flow rate, and the signal indicative of said bi-directional input device being released within a predetermined period of time after said continuous flow switch has/been actuated.

11. The auxiliary hydraulic control system, as set forth in claim 10, wherein said controller is operable to receive a signal indicative of said continuous flow switch being released prior to the release of said bi-directional input device before said controller will output a signal to initiate continuous flow in the selected direction.

12. The auxiliary hydraulic control system, as set forth in claim 10, wherein said controller outputs a signal to discontinue continuous flow in the selected direction within the auxiliary hydraulic circuit when said controller receives a signal indicative of a subsequent actuation of said bi-directional proportional input device.

13. The auxiliary hydraulic control system, as set forth in claim 10, wherein said controller outputs a signal to discontinue continuous flow in the selected direction within the auxiliary hydraulic circuit when said controller receives a signal indicative of a subsequent actuation of said continuous flow switch.

14. The auxiliary hydraulic control system, as set forth in claim 10, wherein the work machine includes an implement joystick for controlling the operation of the implement system, said bi-directional proportional input device being located on said joystick.

15. The auxiliary hydraulic control system, as set forth in claim 14, wherein the continuous flow switch is located on said joystick.

16. The auxiliary hydraulic control system, as set forth in claim 10, wherein the work machine includes an operator restraint mechanism and an operator seat, said auxiliary hydraulic control system further including:

a third switch coupled to the operator restraint mechanism and actuatable to output a signal indicative of when said operator restraint mechanism is not in a restraining condition;

a fourth switch coupled to the operator seat and actuatable to output a signal indicative of when an operator is not present in the operator seat;

a fifth switch actuatable to output a signal to override certain signal inputs to said controller;

said controller coupled to said third, fourth and fifth switches for receiving signals therefrom;

said controller being capable of outputting a signal to discontinue continuous flow when said controller receives a signal indicative of when said operator restraint mechanism is not in a restraining condition;

said controller being capable of outputting a signal to discontinue continuous flow when said controller receives a signal indicative of when an operator is not present in the operator seat;

said controller outputting a signal to continue continuous flow in the selected direction and at the selected flow rate regardless of any signals received from said third and fourth switches when said controller receives a signal indicative of said fifth switch being actuated.

17. The auxiliary hydraulic control system, as set forth in claim 16, wherein said third switch is actuatable to output a signal indicative of when said operator restraint mechanism is in a restraining condition, and said fourth switch is actuatable to output a signal indicative of when an operator is present in the seat, said controller being operable to output a signal to continue continuous flow in the selected direction and at the selected flow rate when said controller receives a signal indicative of said fifth switch being actuated at a time when said third switch is outputting a signal indicative of said operator restraint mechanism being in its restraining condition and at a time when said fourth switch is outputting a signal indicative of an operator being present in the seat.

18. An auxiliary hydraulic control system for controlling the flow of hydraulic fluid within an auxiliary hydraulic circuit associated with a work machine, the auxiliary hydraulic circuit controlling the operation of certain tools which are attachable to the work machine, said auxiliary hydraulic control system comprising:

an electronic controller coupled to a first switch and a second switch to receive signals therefrom, said first switch being a bi-directional proportional momentary switch actuatable to control the direction of flow within the auxiliary hydraulic circuit, said proportional switch being actuatable in one direction to generate a signal indicative of directing fluid flow in a first direction at a flow rate which is proportional to the amount of force being exerted on said switch in said one direction up to a maximum flow rate, said proportional switch being actuatable in another direction to generate a signal indicative of directing fluid flow in a second direction at a flow rate which is proportional to the amount of force being exerted on said switch in said another direction up to a maximum flow rate, said first switch generating said signals for as long as said first switch is held in its actuated position;

said second switch being a momentary switch actuatable to generate a signal to provide continuous flow in one of said first and second directions within the auxiliary hydraulic circuit at the selected flow rate directed by actuation of said first switch;

a first solenoid coupled to said controller for controlling the direction of flow within the auxiliary hydraulic circuit in said first direction;

a second solenoid coupled to said controller for controlling the direction of flow within the auxiliary hydraulic circuit in said second direction;

said controller being operable to receive a signal from said first switch indicative of said first switch being actuated in one of said first and second directions at a selected flow rate depending upon the amount of force being exerted on said first switch in the selected direction, a signal indicative of said second switch being actuated and released, and a signal indicative of when said first switch has been released;

said controller outputting a signal to one of said first and second solenoids to initiate continuous flow in one of said first and second directions and at the selected flow rate directed by said first switch at the time said second switch was actuated when said controller receives the signal indicative of said first switch being actuated in one of said first and second directions, the signal indicative of said second switch being actuated and released, and the signal indicative of said first switch being released within a predetermined period of time after said second switch has been actuated and released.

19. The auxiliary hydraulic control system, as set forth in claim 18, wherein said controller outputs a signal to one of said first and second solenoids to discontinue continuous flow in the selected direction when said controller receives a signal indicative of a subsequent actuation of said first switch.

20. The auxiliary hydraulic control system, as set forth in claim 18, wherein said controller outputs a signal to one of said first and second solenoids to discontinue continuous flow in the selected direction when said controller receives a signal indicative of a subsequent actuation of said second switch.

21. The auxiliary hydraulic control system, as set forth in claim 18, wherein the work machine includes an operator restraint mechanism and an operator seat, said auxiliary hydraulic control system further including:

a third switch coupled to the operator restraint mechanism and actuatable between a first state corresponding to the condition when said operator restraint mechanism is in a non-restraining condition and a second state corresponding to the condition when said operator restraint mechanism is in a restraining condition;

a fourth switch coupled to the operator seat and actuatable between a first state corresponding to the condition when an operator is not present in the seat and a second state corresponding to the condition when an operator is present in the seat; and a fifth switch actuatable to override certain signal inputs to said controller;

said controller coupled to said third, fourth and fifth switches for receiving signals therefrom, said controller being operable to receive a signal indicative of when said third switch is either in or out of its first state, a signal indicative of when said third and fourth switches are either concurrently in their second states or at least one of said third and fourth switches is out of its second state, and a signal indicative of when said fifth switch has been actuated;

said controller being capable of outputting a signal to one of said first and second solenoids to discontinue continuous flow when said controller receives a signal indicative of when said third switch is in its first state;

said controller being capable of outputting a signal to one of said first and second solenoids to discontinue continuous flow when said controller receives a signal indicative of at least one of said third and fourth switches being out of its second state;

said controller continuing to output a signal to one of said first and second solenoids to continue continuous flow in the selected direction and at the selected flow rate regardless of any signals received from said third and fourth switches when said controller receives a signal indicative of said fifth switch being actuated concurrent with said controller receiving a signal indicative of said third switch being out of its first state and a signal indicative of said third and fourth switches being concurrently in their second state.

* * * * *